United States Patent [19]

Segner

[11] 4,287,588
[45] Sep. 1, 1981

[54] MULTIPLE ACCESS, TIME-DIVISION MULTIPLEX, SATELLITE COMMUNICATIONS SYSTEM

[75] Inventor: Samuel M. Segner, West Long Branch, N.J.

[73] Assignee: The United States of America as represented by the Secretary of the Army, Washington, D.C.

[21] Appl. No.: 29,182

[22] Filed: Apr. 12, 1979

[51] Int. Cl.$^3$ .......................... H04L 5/14; H04B 7/26
[52] U.S. Cl. ........................................ 370/29; 370/104
[58] Field of Search ............................ 370/29, 104, 68

[56] References Cited

U.S. PATENT DOCUMENTS

| | | | |
|---|---|---|---|
| 3,827,052 | 7/1974 | Tanaka | 370/29 |
| 3,838,221 | 9/1974 | Schmidt | 370/104 |
| 4,004,098 | 1/1977 | Shimasaki | 370/104 |
| 4,037,158 | 7/1977 | Eastmond | 370/29 |
| 4,062,016 | 12/1977 | Kotezawa | 370/29 |
| 4,145,657 | 3/1979 | Hanni | 370/29 |

Primary Examiner—David L. Stewart
Attorney, Agent, or Firm—Michael C. Sachs; Nathan Edelberg; Jeremiah G. Murray

[57] ABSTRACT

A multiple-access, time-division multiplex, satellite communications system in which the uplink and downlink frequencies are the same.

In each ground station, the outgoing information (be it data, encoded data or digitized samples of the voice frequency signals) are assembled into a sequence of pulses to be transmitted as a burst in the time slot assigned to that particular earth station. If there are n ground stations in the system, $n \geq 2$, then the duration of each ground station sequence is, on the average, $\frac{1}{2}n$ times the duration of a complete frame or epoch, because for half of the epoch the satellite is in the receiving mode and the other half of the epoch the satellite is in the transmitting mode.

8 Claims, 4 Drawing Figures

MULTIPLE ACCESS, TIME-DIVISION MULTIPLEX, SATELLITE COMMUNICATIONS SYSTEM

GOVERNMENT LICENSE

The invention described herein may be manufactured and used by or for the government, for governmental purposes, without the payment of any royalties thereon or therefor.

BACKGROUND OF THE INVENTION (a) Field of the Invention

Broadly speaking, this invention relates to satellite communications systems. More particularly, in a preferred embodiment, this invention relates to a multiple-access, time-division satellite communications system using a common radio frequency for both the up and downlinks to the satellite.

(b) Discussion of the Prior Art

Satellite communications systems have proved to be an effective means of establishing communications between distant geographical areas. The growth of such systems has been limited, however, by the cost of the satellite launch vehicle as well as the cost of the satellite and the ground stations themselves.

In a typical prior art system, the frequency used for the uplink transmission to the satellite differs from the frequency used for the downlink transmission to the ground station, 4 GHZ and 6 GHZ being respectively the transmitting and receiving frequencies most commonly employed for this purpose. This arrangement inevitably complicates the design and implementation of both the satellite and the ground stations, adding to their cost and complexity. It would clearly be preferable to use a common frequency for both the up and downlinks, but heretofore this has not been possible.

Further, while various approaches have been tried to establish multiple-access, satellite communications systems, the fact that different frequencies must be used in the satellite's transmitter and receiver greatly complicates the design of the multiple-access antennas, as well as the switching and multiplexing equipment in the satellite.

Moreover, the coordination of the earth stations, for frequency assignment purposes, has to be considered with respect to two bands; e.g. 4 GHZ and 6 GHZ. This greatly complicates frequency sharing between different satellite communications systems, and between satellite communications systems and terrestrial communications systems because the frequency translation in the satellite systems is relatively fixed, forcing a unique separation on up and down link frequencies.

SUMMARY OF THE INVENTION

The problem, then, is to design a multiple-access, satellite communications system which utilizes a common transmit and receive frequency at both the satellite and ground stations and which is less complicated and more reliable than those heretofore in use.

Fortunately, the above and other problems have been solved by the instant invention which, in a preferred embodiment, comprises a time-division, multiple-access satellite communications system comprising at least one orbiting satellite repeater and n ground stations, $n \geq 2$, communicating with each other via the satellite, each of the ground stations including a transmitter, a receiver and an antenna connected thereto, characterized in that the transmitter and receiver operate on the same frequency. Each of the ground stations further comprises means for processing a plurality of information channels for transmission as a compressed pulse sequence to the remaining (n-1) ground stations in the system, each of the information channels having priorly been sampled and digitized; first means for multiplexing the plurality of information channels into a sequence of digital samples for transmission in the one or more time slots assigned to that ground station in a transmission frame or epoch having a duration, on the average, which is n times greater than the duration of the sequence, the sequence generated by each multiplexing means in the system occupying a unique, non-overlapping segment of the transmission frame or epoch; means for modulating the transmitter with the output of the multiplexing means; and means, interposed between the antenna and the output of the transmitter, for enabling the transmitter for transmission to the satellite only during the time duration of the corresponding sequence of digital samples. The invention and its mode of operation will be more fully understood from the following detailed description when taken with the appended drawings in which:

DETAILED DESCRIPTION OF THE INVENTION

Figure 1:
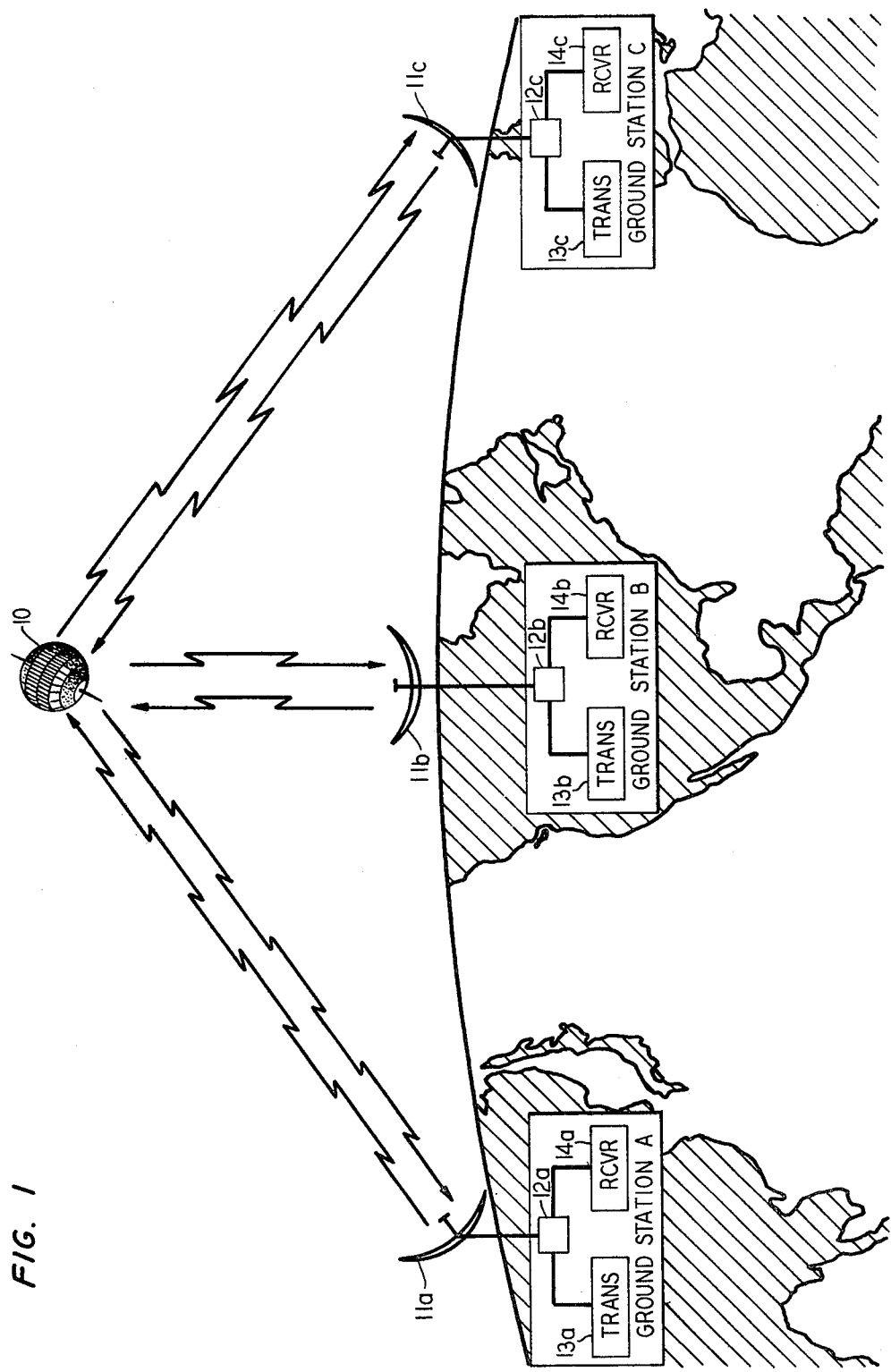
FIG. 1 is a partially schematic, partially diagrammatic view of an illustrative, multiple access, satellite communications system according to the invention.

FIG. 1 depicts an illustrative satellite communications system according to the invention. As shown, satellite repeater 10 is in communication with three ground stations A, B and C, respectively, each of which includes an antenna 11, an rf switch 12 and a radio frequency transmitter and receiver 13 and 14, respectively. Satellite 10 is advantageously synchronous, i.e. in a stationary orbit, but asynchronous operation is also encompassed by this invention. Also, one skilled in the art will appreciate that the arrangement shown in FIG. 1 is only illustrative and that a practical embodiment of the invention may have more than one satellite repeater and more or less than three ground stations.

It should be pointed out that to simplify the explanation, it has been assumed that the information channels in the illustrative system are all voice-frequency channels and that all n stations in the system have the same number of information channels. However, the information channels can carry digital or analog data, or encoded data with equal facility. Moreover, different ground stations may, in a practical system, have unequal numbers of channels. Further, while the system antenna is normally a parabolic dish at microwave frequencies, the use of a phased array, at lower frequencies, is also possible. If a phased array were used, it could operate simultaneously in more than one satellite communications network, provided, of course, that all time networks were synchronized and coordinated as to relative epoch.

Figure 2:
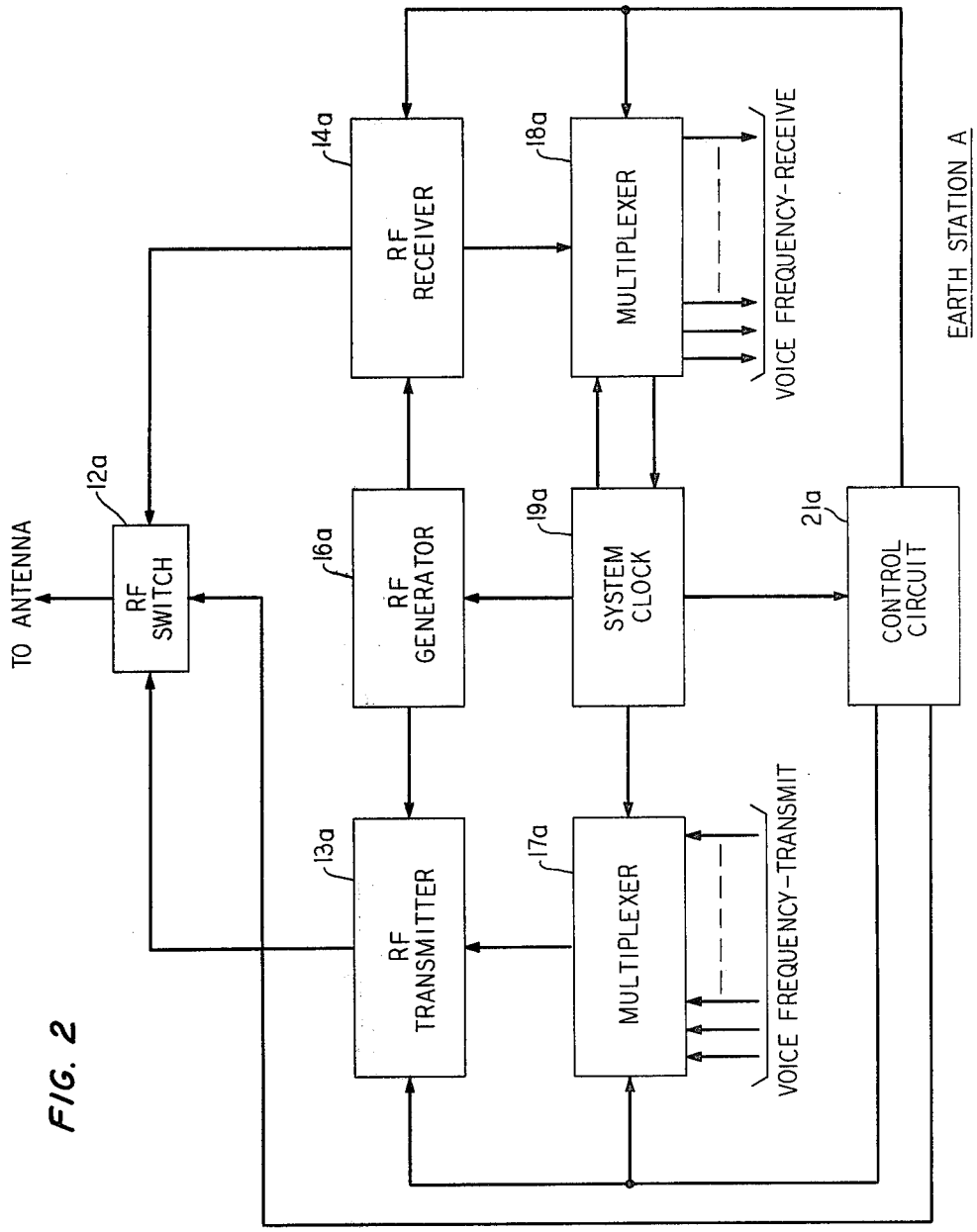
FIG. 2 is a block schematic drawing of an illustrative ground station for use with the system shown in FIG. 1.

FIG. 2 depicts ground-station A in greater detail. Grounds stations B and C are essentially identical to ground station A; hence need not be discussed in detail. As shown, antenna 11a is connected to an rf switch 12a, thence to either transmitter 13a or receiver 14a. Transmitter 13a is connected to the output of an rf generator 16a and to the output of a first multiplexer 17a which has as its input the several voice-frequency channels to be transmitted to ground stations B and C, via satellite 10. In like manner, the receiver 14a is also connected to generator 16a and to the output of a second multiplexer 18a the output of which comprises the several voice-frequency channels received from ground stations B and C, via the satellite. A system clock 19a is connected to both of the muliplexers and to the rf generator to insure synchronous operation, as will be explained. Clock 19a, also is connected to a control circuit 21a which, inter alia, controls rf switch 12a and both of the multiplexers.

As previously discussed, in the above arrangement transmitter 13a and receiver 14a both operate on the same frequency. The same then must be true for the transmitter and receiver in the satellite, not shown in the drawing. Rf generator 16a, thus supplies a signal for the power amplifier in transmitter 13a and for the heterodyne detector (not shown) in receiver 14a.

Obviously, in such a system to prevent damage the receiver must be shut-off while the transmitter is transmitting. This is accomplished by switch 12a in the ground station and by a similar arrangement (not shown) in the satellite. In the satellite, means are provided to delay or store the information received from the ground stations by a period of time $T_x$ so that the satellite receiver operates on an approximately 50% duty cycle (less a very small guard interval to avoid overlap).

Advantageously, the n ground stations using the satellite use time division multiple access to the satellite. At each ground station, the receiver will be open for about a 50% duty cycle but the transmitters will be energized for only a ($\frac{1}{2}$n) duty cycle.

It is clearly a waste of a valuable resource to have the satellite transmitter in use only 50% of the time. Accordingly, a second embodiment of the invention proposes that the satellite transmitter be switched back and forth between two bands, each having almost a 50% duty cycle for transmission.

In operation, assume that each voice channel to be transmitted has priorly undergone a conventional analog-to-digital conversion. Thus, multiplexer 17a will output a series of frames each comprising a plurality of sample words themselves comprising a sequence of binary digits. If a PCM process is used for the A/D conversion, each sample word may comprise several address bits plus a PCM code representating a Nyquist note amplitude sample of the voice frequency signal in the channel.

In the illustrative embodiment, there are three ground stations, thus n=3. To simplify the following discussion, assume that each ground station transmits only four voice frequency channels, two to each of the other ground stations.

Figure 3:
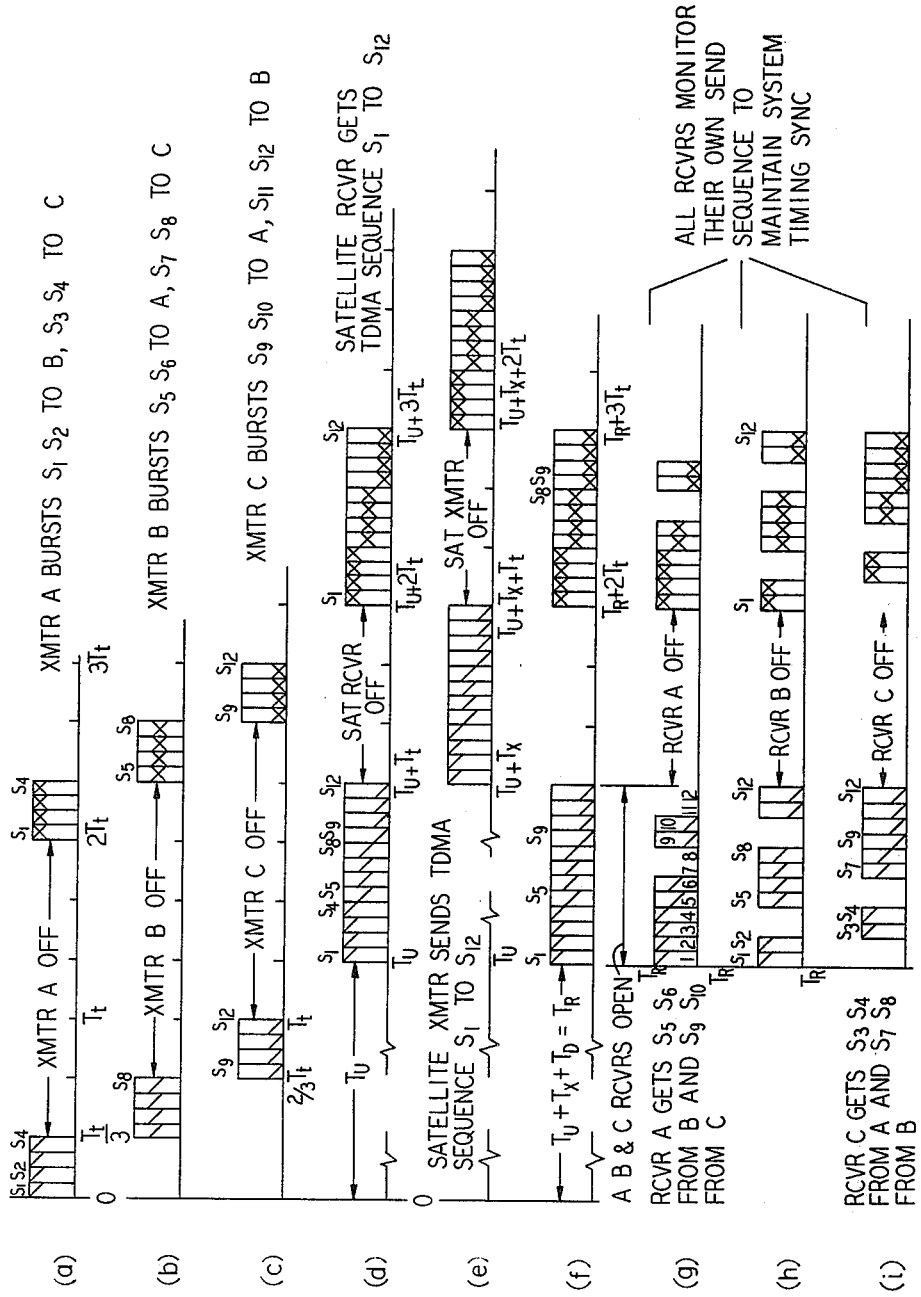
FIG. 3 is a diagram which follows the operation of the satellite communications system shown in FIG. 1 through two successive time frames.

Referring now to FIG. 3, the duration of each complete transmit frame is $T_t$. $T_t$ is the total time that all earth station transmitters are on and is therefore half the total time frame of epoch. As previously discussed, each ground station transmitter will be connected to the antenna for the interval $T_t/n$ or $T_t/3$ in the illustrative example. This is illustrated in Graphs (a), (b) and (c) of FIG. 3.

During each interval $T_t$, sample words $S_1$, $S_2$, $S_3$, $S_4$, $S_5$, $S_6$, $S_7$, $S_8$, $S_9$, $S_{10}$, $S_{11}$ and $S_{12}$ will be transmitted to the satellite according to the following scheme.

TRANSMITTER 13a TRANSMITS $S_1S_2S_3S_4$; $S_1+S_2$ to receiver 14b, $S_{30}+S_4$ to receiver 14c TRANSMITTER 13b TRANSMITS $S_5S_6S_7S_8$; $S_5+S_6$ to receiver 14a, $S_7+S_8$ to receiver 14c TRANSMITTER 13c TRANSMITS $S_9S_{10}S_{11}S_{12}$; $S_9+S_{10}$ to receiver 14a; $S_{11}+S_{12}$ to receiver 14b After an uplink delay of $T_u$, the satellite receiver is opened to receive the sequence $S_1$, $S_2$ . . . $S_{12}$. The receiver then shuts off at $T_u+T_t$, as shown in graph (d) in FIG. 3.

After a short delay $T_x$, the satellite transmitter is turned on, then transmits the sequence $S_1$, $S_2$ . . $S_{12}$ to all ground stations, finally the transmitter is turned off at $T_d \times T_t$, as shown in graph (e) in FIG. 3.

On the ground, receiver 14a in ground station A is turned on to receive the sequence $S_1S_2S_3S_4S_5S_6S_9$ and $S_{10}$, as shown in graph (g) of FIG. 3. The sequence $S_1S_2S_3S_4$ is used to synchronize the multiplexer 18a, whereas the sequences $S_5S_6$ and $S_9S_{10}$ are decoded as transmissions originating in ground stations B and C, respectively.

In like manner, receiver 14b in ground station B is turned on to receive the sequence $S_1S_2S_5S_6S_7S_8S_{11}S_{12}$, as shown in graph (h) of FIG. 3. The sequence $S_5S_6S_7S_8$ is used to synchronize the multiplexer 18b and the sequences $S_1S_2$ and $S_{11}S_{12}$ are decoded as transmissions originating in ground stations A and C, respectively.

In like manner, receiver 14c in ground station C is turned on to receive the sequence $S_3S_4S_7S_8S_9S_{10}S_{11}S_{12}$, as shown in graph (i) of FIG. 3. The sequence $S_9S_{10}S_{11}S_{12}$ is used to synchronize multiplexer 18c and the sequences $S_3S_4$ and $S_7S_8$ are decoded as transmissions originating in ground stations A and B, respectively.

Figure 4:
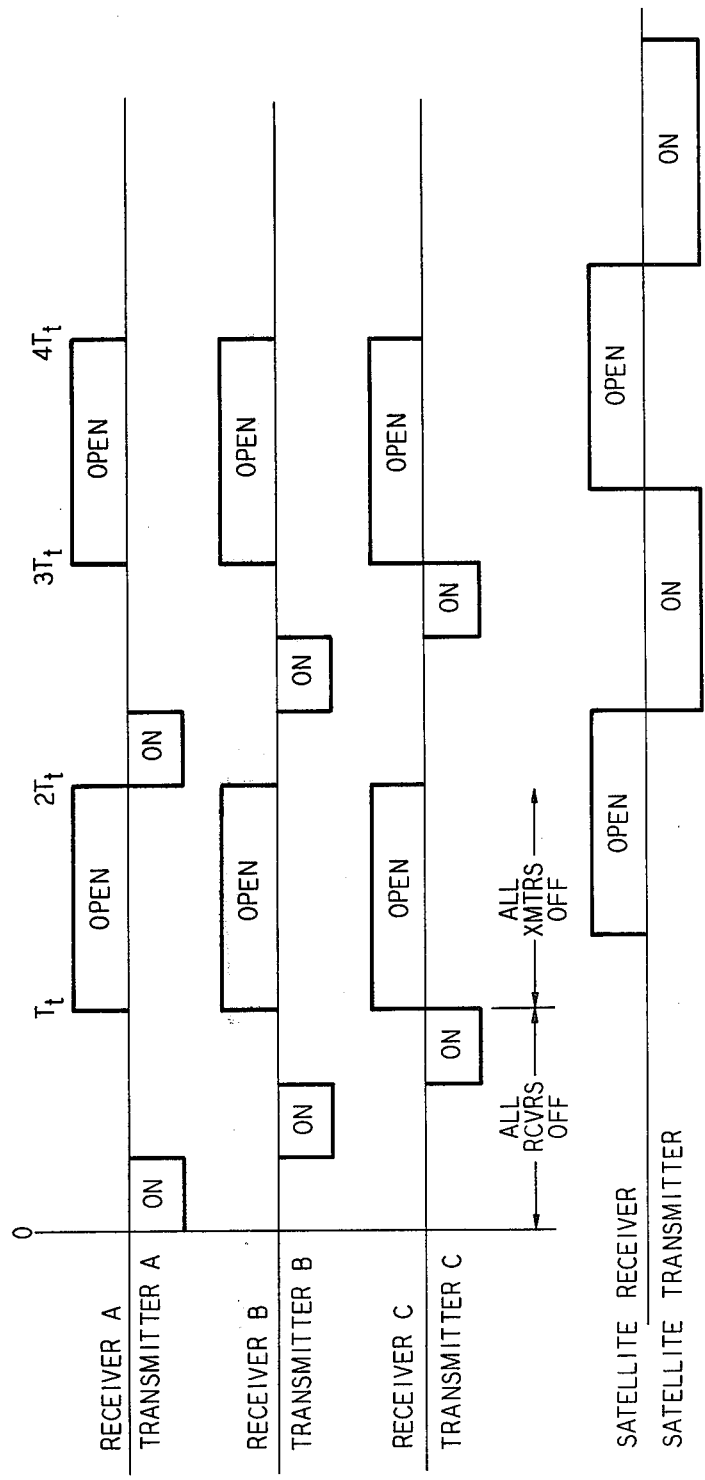
FIG. 4 is a graph illustrating the duty cycles of the ground stations and satellite repeater in the system shown in FIG. 1.

FIG. 4 depicts the duty cycles, for both transmitter and receiver, for al three ground stations as well as the satellite repeater. It will be observed that the duty cycle of receiver 14a is exactly 50% of $T_u+T_d+T_x=kT_t$, where K=1, 3, 5 . . . $T_u+T_d$, the round trip delay from ground station A to the satellite, is normally in the range of 240–260 milliseconds, depending upon the particular orbit of the satellite. $T_t$, the duration of a frame, is normally a fraction of a millisecond. $T_x$, the delay before the satellite transmitter is energized after receipt of the last sequence from the ground, is selected so that in the satellite, both the transmitter and receiver have a 50% duty cycle. This is done by setting $T_x = mT_t$ where m is an odd integer.

All of the above assumes that no guard times are needed to protect the receivers. If this is not the case, these ideal duty cycles would be reduced from the 50% figure to something less than 50%. Further, where it is desired to reduce the instantaneous heating of the earth station or satellite transmitter, it is possible to distribute the bursts across the epoch $2T_t$, although this complicates system management.

The principles of the instant invention can, of course, be applied to cover terrestrial or airborne radio systems. Further, one skilled in the art may make various changes and substitutions without departing from the spirit and the scope of the invention.

What is claimed is:

1. A time-division, multiple access satellite communications system comprising at least one orbiting satellite repeater and n ground stations, n≧2, communicating with each other via said satellite, each of said ground stations including a transmitter, a receiver and an antenna connected thereto, characterized in that:

said transmitter and receiver operate in full duplex mode on the same uplink and downlink frequency, and each of said ground stations further comprises:

(a) means for processing a plurality of information channels for transmission as a compressed pulse sequence to the remaining (n-1) ground stations in said system, each of said information channels having priorly been sampled and digitized;

(b) first means for multiplexing said plurality of information channels into a sequence of digital samples for transmission in the one or more time slots allocated to that ground station in a transmission frame or epoch having a duration, on the average, n times greater than the duration of said sequence, the sequence generated by each multiplexing means in said system occupying a unique, non-overlapping segment of said transmission frame or epoch;

(c) means for modulating said transmitter with the output of said multiplexing means; and (d) means interposed between said antenna and the output of said transmitter, for enabling said transmitter for transmission to said satellite only during the time duration of the corresponding sequence of digital samples.

2. The system according to claim 1 wherein said satellite repeater includes means for storing at least one full transmission frame comprising the non-overlapping sequences of digital samples received from all n of said ground stations, said satellite repeater subsequently re-transmitting said frame to all n ground stations, characterized in that;

in each of said ground stations said transmitter enabling means also serves to enable said receiver for reception from said satellite repeater only during the duration of said transmission frame, each of said ground stations further comprising:

(e) second multiplexing means, connected to the output of said receiver, for converting selected ones of the sequences of digital samples in said frame or epoch into digitized samples of the digital information channels to be received by said ground station; and (f) means, responsive to other ones of the sequences of digital samples in said frame or epoch, for maintaining synchronism between said first and second multiplexing means and said satellite repeater and the (n−1) remaining ground stations in said system.

3. The system according to claim 2 wherein the duration of each transmission frame or epoch is $T_t$, the duration of the delay imposed on each transmission frame in said satellite repeater is $T_x$, the time taken for each transmission frame to travel up to said satellite repeater is $T_u$, and the time taken for each transmission frame to travel down from said satellite repeater is $T_d$, characterized in that to insure that the duty cycle for the receiver associated with each of said n ground stations is in the order of 50%:

$T_x$, the delay in said satellite repeater is selected according to the relationship $$T_u + T_d + T_x = kT_t$$

where k is an odd integer.

4. The system according to claim 1, 2 or 3 wherein said information channel carries information signals selected from the group consisting of:
 (a) digital data
 (b) analog data
 (c) encoded data, and
 (d) voice frequency information.

5. A method of transmitting information between the ground stations in a time division, multiple access satellite communications system, operating in a full duplex mode, of a type that includes at least one orbiting satellite repeater and n ground stations communicating via said satellite, N≧2, each ground station including a transmitter, a receiver and an antenna connected thereto, characterized by the steps of, at each ground station:

(a) multiplexing the plurality of information channels intended for transmission to the remaining (n−1) ground stations in said system into a sequence of digital samples in a transmission frame or epoch having a duration, on the average, which is n times greater than the duration of said sequence, each of said information channels having been priorly sampled and digitized; and (b) transmitting said sequence of digital samples to said repeater such that said sequence occupies a unique, nonoverlapping segment of said transmission frame; and (c) temporarily delaying in said satellite repeater the transmission frame comprising the sequence of digital samples received from all n ground stations for a first, predetermined time interval wherein: the duration of each transmission frame or epoch is $T_t$, the duration of the delay imposed on each transmission frame in said satellite repeater is $T_x$, the time taken for each transmission frame to travel up to said satellite repeater is $T_u$, and the time taken for each transmission frame to travel down from said satellite repeater is $T_d$, characterized in that to insure that the duty cycle for the receiver associated with each of said n ground stations is on the order of 50%:

$T_x$, the delay in said satellite repeater is selected according to the relationship $$T_u + T_d + T_x = kT_t$$

where k is an odd integer, and then;

(d) retransmitting said transmission frame simultaneously to all n ground stations.

6. The method according to claim 5 characterized by the further steps of, each ground station:

activating said receiver to receive at least the (n−1) sequences of samples transmitted, via said satellite repeater, from the remaining (n−1) ground stations in said system to said ground station.

7. The method according to claim 6 characterized by the further steps of, at each ground station:

activating said receiver to receive at least one additional sequence of samples, said additional sequence serving to synchronize said ground station to the (n−1) other ground stations.

8. The method according to claims 5, 6 or 7 wherein each of said information channels carries a signal selected from the group comprising
 (a) digital data
 (b) analog data
 (c) encoded data, and
 (d) voice-frequency information.

* * * * *